(12) United States Patent
Osterberg et al.

(10) Patent No.: US 8,417,123 B2
(45) Date of Patent: *Apr. 9, 2013

(54) SYSTEM AND METHOD FOR SHAPING A WAVEFORM

(75) Inventors: Ulf L. Osterberg, Etna, NH (US); Colby Dill, III, Holliston, MA (US)

(73) Assignee: Lightkey Optical Components, LLC, Hamden, CT (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/787,263

(22) Filed: May 25, 2010

(65) Prior Publication Data
US 2010/0232807 A1 Sep. 16, 2010

Related U.S. Application Data

(63) Continuation of application No. 11/388,571, filed on Mar. 24, 2006, now Pat. No. 7,756,420.

(51) Int. Cl.
*H04B 10/12* (2006.01)
(52) U.S. Cl. .................... 398/142; 398/149; 398/160
(58) Field of Classification Search .......... 398/140–142, 398/158–160, 147–149
See application file for complete search history.

(56) References Cited

U.S. PATENT DOCUMENTS

| | | | |
|---|---|---|---|
| 3,636,356 A | 1/1972 | Giordmaine | |
| 4,560,246 A | 12/1985 | Cotter | |
| 5,682,262 A | 10/1997 | Wefers et al. | |
| 5,719,650 A | 2/1998 | Wefers et al. | |
| 6,075,640 A | 6/2000 | Nelson | |
| 6,778,730 B2 | 8/2004 | Hironishi | |
| 6,826,209 B1 | 11/2004 | Morita et al. | |
| 6,885,713 B2 | 4/2005 | Olson et al. | |
| 7,058,311 B1* | 6/2006 | Islam et al. | 398/140 |
| 7,756,420 B2* | 7/2010 | Osterberg et al. | 398/142 |
| 2004/0005153 A1 | 1/2004 | Watanabe | |
| 2004/0081471 A1 | 4/2004 | Lee | |
| 2004/0156572 A1* | 8/2004 | Richardson et al. | 385/1 |
| 2004/0179850 A1 | 9/2004 | Katagiri et al. | |
| 2005/0095012 A1 | 5/2005 | Watanabe | |
| 2007/0036553 A1* | 2/2007 | Etemad et al. | 398/140 |

OTHER PUBLICATIONS

International Search Report and Written Opinion of the International Searching Authority; PCT/US07/00501; Oct. 18, 2007; 6 pages.

* cited by examiner

*Primary Examiner* — Dzung Tran

(74) *Attorney, Agent, or Firm* — St. Onge Steward Johnston & Reens LLC

(57) ABSTRACT

An optical transmission system for transmitting an optical pulse in a dielectric waveguide, the system including a filter for altering a shape of the optical pulse in both amplitude and phase with respect to time so as to substantially suppress the generation of third-order nonlinearities and increase a power level of the optical pulse, the filter further providing a secure encrypted optical waveform that may be decrypted by a matching optical filter, the system allowing for energy sharing of the pulses to substantially increase system bandwidth.

14 Claims, 7 Drawing Sheets

SYSTEM AND METHOD FOR SHAPING A WAVEFORM

CROSS-REFERENCE TO RELATED APPLICATION

This application is a continuation of U.S. patent application Ser. No. 11/388,571 filed on Mar. 24, 2006, now U.S. Pat. No. 7,756,420 the content of which is incorporated herein by reference.

FIELD OF THE INVENTION

This invention relates to the field of optical transmission of data and in particular to methods of, and apparatus for, optical transmission along dielectric waveguides, and to optical communication systems employing optical transmission.

BACKGROUND OF THE INVENTION

Optical transmission of information provides numerous benefits over conventional electromagnetic data transmission including, for example, much higher data capacity and transfer rates with decreased energy consumption.

Optical transmission of data or information employs electromagnetic waves from a spectrum of wavelengths, including, but extending well beyond, visible light, and expressions herein such as "optical", "light" and related terms are accordingly to be understood in the wider sense of referring to electromagnetic waves within this broader spectrum of wavelengths.

Optical transmission of data or information is typically accomplished by transmission through a dielectric waveguide, such as a fiber optic cable. Light may effectively be modulated in accordance with the data or information to be transported along the dielectric waveguide.

Presently, the majority of optical communication systems presently in operation use direct intensity modulation for conveying digital information. A typical optical telecommunications system is described for example, in the reference Digital Signal Transmission, by C. C. Bissell, and D. A. Chapman, Cambridge Univ. Press, 1992.

Optical transmission systems, due to the many advantages they present, have become widely used for telecommunications. An optical network, such as for example, a local area network (LAN), metropolitan area network (MAN), and wide-area network (WAN), typically include a transmitter at an input end, a receiver at an output end, and a communications medium in between (e.g. an optical fiber). The transmitter's main task is to convert an electrical signal to an optical signal. As the electrical signal enters the transmitter, the binary electrical pulses may be channel and line coded to optimize the integrity of the conveyed data sequence and make it suitable for transmission as, for example, optical pulses.

Typically, a final step for the transmitter is use of an optical pulse generator, which converts the electrically coded pulses into optical pulses. The optical pulse generator may be modeled as a filter with the impulse response related to the desired pulse shape. This type of filter is directed to the actual transmission and detection of individual pulses. This type of filter may, to an extent, be tailored to provide increased bandwidth utilization and for improving receiver sensitivity.

Methods for multiplexing of data and information are also known. For example, digital modulation techniques include variations on neutral, unipolar, polar, NRZ, RZ, and bi-phase.

Many optical fiber communications systems use NRZ in conjunction with amplitude on/off modulation for data speeds up to 10 Gb/s.

The more common multiplexing methods include for example, time-division multiplexing (TDM), wavelength-division multiplexing (WDM), and code-division multiplexing (CDM). TDM assigns specific time-slots for every user bits; WDM assigns different wavelengths for different users and/or sub-networks; and CDM assigns each user with a code rather than a time slot and/or specific wavelength.

CDM may, to a certain extent, be viewed as a mixture of TDM and WDM. CDM is becoming the dominant multiplexing method for RF wireless networks and is suggested as the future multiplexing method for optical fiber networks.

When examining TDM, WDM and CDM, each present specific challenges. For example, the main disadvantages with the TDM and WDM methods are: relatively high crosstalk due to optical nonlinearities, the need for temporal and spectral guard bands and a lack of a secure encryption method. A main disadvantage with CDM is the inefficient use of the bandwidth, in addition to some of the disadvantages associated with TDM and WDM.

A number of systems have attempted to provide methods for altering various characteristics of a waveform, such as U.S. Pat. No. 6,826,209 to Morita et al. ("the '209 patent"), which discloses an ultra-broadband, variable and multiple wavelength, waveform shaping apparatus. A light pulse generator enables a fundamental wave light pulse to bring about a self-phase modulation effect, which results in expansion of the spectrum, or causes an induced phase modulation effect between the fundamental wave pulse and the pulse generated by a nonlinear phenomenon that takes place using the fundamental wave pulse. However, the '209 patent fails to teach a system or method that addresses the problems associated with TDM, WDM and CDM, in particular, the problems associated with third-order nonlinearities.

U.S. Pat. No. 6,778,730 to Hironishi ("the '730 patent") also discloses an optical signal processing device which provides a stable temporal order to the modulation-phases of a plurality of optical signals, the system including an optical demultiplexer and an optical multiplexer for adaptation to WDM (wavelength division multiplexing). However, while the '730 patent may be adapted for use with WDM, the '730 patent fails to teach a system or method that addresses third-order nonlinearity problems in optical transmission systems.

U.S. Pat. No. 5,682,262 to Wefers et al. ("the '262 patent") still further discloses a method and device for shaping both the temporal and spatial profiles of an input optical pulse to generate an output optical waveform. Waveforms generated with the pulse-shaping device have spatial profiles which either match the pattern imparted by a mask on the optical field (i.e., "shadow imaging") or are the Fourier transform of the pattern (i.e., "Fourier imaging"). However, the '262 patent fails to teach any kind of system or method that addresses third-order nonlinearity problems in optical transmission systems.

Still another challenge facing the optical transmission industry today is effective encryption of data transmitted via an optical medium. While various encryption methods are known, typically the methods include encryption of the data prior to conversion to an optical signal. One system that has attempted to deal with this challenge is U.S. Published Patent Application No. 2004/0081471 to Lee ("the '0081471 application"), which discloses a method of transmitting data in a dense mode wavelength division multiplex optical system and generally includes the steps of: selectively combining data from a plurality of data channels in a corresponding plurality of optical channels in accordance with an encryption key, transmitting the plurality of optical channels, receiving the plurality of optical channels, and selectively de-combining the data from the plurality of optical channels to receive the plurality of data channels in accordance with the encryption key. However, as with any data encryption system, a determined individual with enough computer power may break the encryption method taught in the '0081471 application.

SUMMARY OF THE INVENTION

Therefore, what is desired then is a system and method that provides for the transmission of light along a dielectric waveguide by methods which avoid at least some of the disadvantages associated with TDM, WDM and CDM multiplexing as stated above.

It is further desired to provide a system and method for the transmission of light along a dielectric waveguide, where optical nonlinear effects are substantially suppressed.

It is still further desired to provide a system and method for the transmission of light along a dielectric waveguide, which provides for an enhanced encryption method of the optically transmitted data or information.

These and other objects are achieved, in one advantageous embodiment, by providing a method of transmitting light along a dielectric waveguide using a pulse shaping device or filter, which is located between, for example, the modulated laser data stream and the optical fiber. This pulse shaping device or filter acts to alter the laser output signal (waveform, pulse) in a specific, calculated way both temporally and spectrally.

One of the purposes of this type of waveform shaping, is to spectrally arrange the pulse energy in such a manner that it is maintained below a level of nonlinear excitation.

For this application, the term "level of nonlinear excitation" is to be understood as an energy level that is sufficiently high so as to produce optical third order nonlinearities, such as for example but not limited to: Self-Phase Modulation (SPM), Cross-Phase Modulation (CPM), Stimulated Raman Scattering (SRS), Four-Wave Mixing (FWM), and so forth. It is advantageous to minimize or substantially avoid third order nonlinearities, such as may be encountered with TDM, WDM and CDM. Third order nonlinearities may cause for example, attenuation of the signal, signal dispersion and/or cross talk between differing channels.

Therefore, one of the objects of the invention is to spectrally arrange the pulse energy so that it is maintained below a level of nonlinear excitation thus avoiding many of the problems associated with third order nonlinearities as described above. Another purpose of the waveform shaping is to provide a method for temporally and spectrally sharing the energy of the pulses selectively for different users on the optical fiber, thereby increasing overall efficiency.

Selective waveform shaping also allows for selective detection using, for example, a matched filter device providing for a highly secure encryption method. This form of waveform shaping encrypts the optical signal itself rather than the data prior to conversion to an optical signal. The encrypted pulses in turn, are maintained at an energy level that is below a threshold level at which nonlinearity problems begin to manifest themselves on the fiber.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment, a method for transmitting data as an optical pulse along a dielectric waveguide is provided, comprising the steps of identifying a third-order nonlinearity threshold, and generating an optical pulse including input data, the optical pulse having a shape and a power level which exceeds the identified third-order nonlinearity threshold, for conventional pulses. The method further comprises the step of altering the optical pulse shape in both amplitude and phase with respect to time to form a modified shape which is substantially maintained below said third-order nonlinearity threshold so as to avoid development of third-order nonlinearities occurring in the dielectric waveguide during transmission of said optical pulse and to increase the power level of the optical pulse. The method further comprises the step of inputting the optical pulse into the optical fiber for propagation down the dielectric waveguide.

In another advantageous embodiment, a system for transmitting data as an optical pulse along a dielectric waveguide is provided, comprising an optical pulse generator for generating an optical pulse including input data to be transmitted, and a first filter coupled to the optical pulse generator, the first filter receiving the optical pulse. The system is provided such that the first filter alters a shape of the optical pulse in both amplitude and phase with respect to time to form a modified optical pulse shape so as to suppress generation of third-order nonlinearities in the dielectric waveguide and to increase a power level of the optical pulse. The system is further provided such that the first filter is coupled to the dielectric waveguide and the modified optical pulse is inputted into and transmitted along the dielectric waveguide.

In still another advantageous embodiment, a method for securely transmitting data in the form of an optical pulse along a dielectric waveguide is provided, comprising the steps of generating an optical pulse including input data to be transmitted, and altering a shape of the optical pulse in amplitude and phase with respect to time to encrypt the input data within the optical pulse. The method further comprises the steps of inputting the modified optical pulse into the dielectric waveguide for propagation down the dielectric waveguide, and altering the modified optical pulse shape in amplitude and phase with respect to time to de-crypt the data within the optical pulse. The method still further comprises the step of converting the optical pulse to output data substantially corresponding to the input data.

In yet another advantageous embodiment, a system for securely transmitting data in the form of an optical pulse along an dielectric waveguide is provided, comprising an optical pulse generator for generating an optical pulse including input data to be transmitted. The system further comprises a filter coupled to the optical pulse generator, for receiving the optical pulse, the filter formed according to the following formula:

$$h(t) = \int_{-\infty}^{\infty} H(\omega)e^{-j\omega t}\,d\omega$$

where $H(\omega)$ is a data transfer function that is determined as a function of frequency. The system is provided such that the first filter alters a shape of the optical pulse in both amplitude and phase with respect to time to encrypt the optical pulse, the first filter is coupled to the dielectric waveguide, and the encrypted optical pulse is inputted into and transmitted along the dielectric waveguide.

In still another advantageous embodiment, a system for transmitting data as an optical pulse along a dielectric waveguide is provided, comprising an optical pulse generator for generating an optical pulse including input data to be transmitted and a filter coupled to the optical pulse generator for receiving the optical pulse, the filter having an impulse response h(t), which is a Fourier transform of a data transfer function $H(\omega)$. The system is provided such that the filter alters a shape of the optical pulse in both amplitude and phase with respect to time to form a modified optical pulse shape so as to substantially maintain the optical pulse below an identified threshold energy level at which third-order nonlinearities occur and to increase the power level of the optical pulse.

Other objects of the invention and its particular features and advantages will become more apparent from consideration of the following drawings and accompanying detailed description.

DETAILED DESCRIPTION OF THE DRAWINGS

Figure 1:
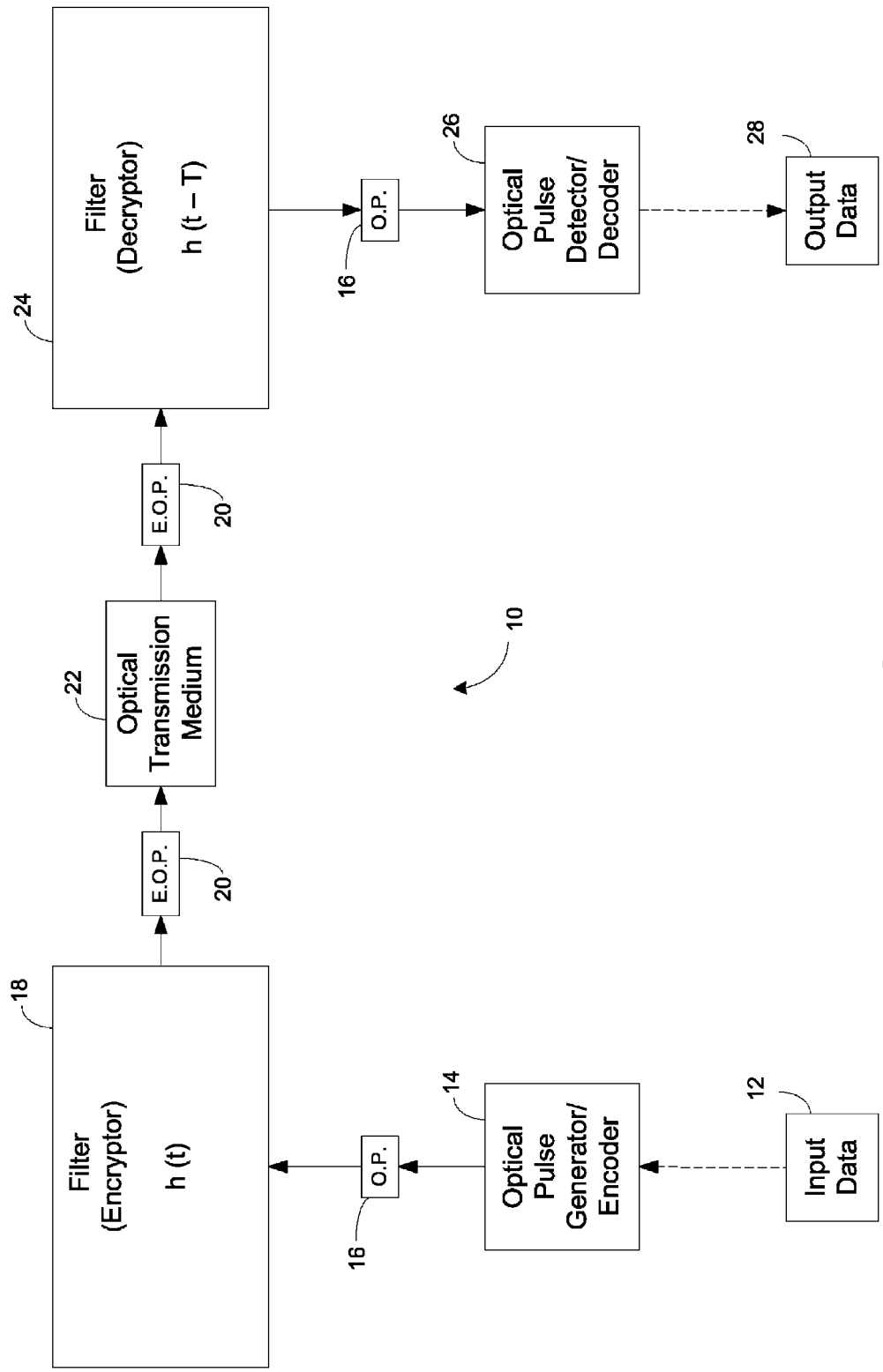
FIG. 1 is a block diagram of one advantageous embodiment of the present invention.

Referring now to the drawings, wherein like reference numerals designate corresponding structure throughout the views.

The principles of the present invention are now described with reference to an embodiment using, for example, a long haul fiber optic network. However the principals of the present invention are applicable to other shared medium networks that employ medium that are dispersive, absorptive, and nonlinear.

Referring now to FIG. 1, optical transmitting system 10 is illustrated as a block diagram. Input data 12 is provided to optical pulse generator/encoder 14, which transforms the electronic input data 12 (illustrated as dashed line) to an optical pulse 16 (illustrated as solid line). Various forms of coding of the input data may occur at this stage and will be discussed in connection with FIG. 3.

Optical pulse 16 is then fed to filter (encryptor) 18. The optical pulse 16 is now transformed into an encrypted optical pulse 20. It is contemplated that filter (encryptor) 18 may comprise a spatial light modulator, a reflective fiber Bragg grating, a transmitting fiber Bragg grating, a Mach-Zehnder interferometer (MZI) type optical gate, or similar technique. In this manner, waveform shaping and encryption occurs at the optical level rather than at the electrical data level.

Filter (encryptor) 18 uses spatial changes in its refractive index to prescribe new properties onto optical pulse 16 to generate encrypted optical pulse 20. This provides a number of significant advantages.

First, the pulse energy of encrypted optical pulse 20 is spectrally arranged such that it is essentially maintained below a level of nonlinear excitation. This allows the system to avoid the many problems associated with third order nonlinearities.

It is also desirable to increase the energy level of optical pulse 16 for more efficient propagation over a long haul fiber optic network. However, it must be noted that in conventional systems, increasing the energy level too much, specifically over the threshold at which third-order nonlinearity become an issue, will result in many of the problems associated with third order nonlinearities as previously described thereby decreasing overall efficiency. Therefore, it is highly desirable to increase the energy level of optical pulse 16, while at the same time avoid third order nonlinearity problems. Filter (encryptor) 18 prescribes new properties onto optical pulse 16, such that the resulting encrypted optical pulse 20 substantially avoids exceeding the identified third order nonlinearity threshold.

Filter (encryptor) 18 alters the optical pulse shape of optical pulse 16 in both amplitude and phase with respect to time to form encrypted optical pulse 20, which has a modified optical pulse shape and more efficiently utilizes the frequency bands below the third order nonlinearity threshold. It is still further contemplated that, because the optical pulse shape of optical pulse 16 may be fairly easily controlled, optical pulse generator/encoder 14 can actually be used to generate and optical pulse that exceeds the identified third order nonlinearity threshold. However, the energy that exceeds the third order nonlinearity threshold is repositioned in both amplitude and phase with respect to time in such a manner that the encrypted optical pulse 20 does not exceed the identified third order nonlinearity threshold. In this manner, filter (encryptor) 18 allows for an overall increase in the power level of encrypted optical pulse 20 while still avoiding third order nonlinearity problems as the increased energy is relocated to substantially avoid exceeding the third order nonlinearity threshold.

Filter (encryptor) 18 therefore, acts as a linear filter, where an input signal or optical pulse 16 comprises data (e.g. a signal from a telephone company), while the output from filter (encryptor) 18 is a scrambled version of the input according to a data transfer function $H(\omega)$ of filter (encryptor) 18. Data transfer function $H(\omega)$ is a function of frequency and is calculated according to what the individual customer desires for system performance. Once data transfer function $H(\omega)$ is determined, based on consultation with the customer, an impulse response h(t) of filter (encoder) 18 may then be calculated. Impulse response h(t) is a Fourier transform of a data transfer function H(ω) and may be calculated according to the following formula:

$$h(t) = \int_{-\infty}^{\infty} H(\omega) e^{-j\omega t} \, d\omega \qquad \text{Formula 1}$$

Filter (encryptor) 18 may therefore be provided as a unique filter arrangement that will prescribe new properties to optical pulse 16 as a unique filter. It is contemplated that virtually an infinite number of filter arrangements may be produced, each having the ability to prescribe new and unique properties to optical pulse 16.

Another purpose of the waveform shaping accomplished by filter (encryptor) 18 is to provide a method for temporally and spectrally sharing the energy of the pulses selectively for different users on the optical fiber. This results in the system bandwidth being substantially increased. This function will be described in greater detail in connection with FIG. 2.

Selective waveform shaping also allows for selective detection using, for example, a matched filter device providing for a highly secure encryption method.

Referring back to FIG. 1, encrypted optical pulse 20 is fed into optical transmission medium 22, which may comprise any dielectric waveguide, such as for example, but not limited to, an optical fiber.

It is contemplated that, due to the increase in the power level of optical pulse 16 performed by optical pulse generator/encoder 14, very few or a reduced number of repeaters (not shown) may be used in connection with optical transmission medium 22. Repeaters typically perform, for example, pulse detection, re-timing and error detection, and pulse generation.

Encrypted optical pulse 20 is finally received by filter (decryptor) 24, which may comprise the same device as filter (encryptor) 18, but is reversed so as to reform or reconstitute optical pulse 16 from encrypted optical pulse 20. In this manner, the power level of optical pulse 16 may be greatly increased, while at the same time problems associated with third order nonlinearities may be substantially avoided, reducing the number of repeaters that may be required with, for example, the long haul fiber optic network.

Optical pulse detector/decoder 26 then receives optical pulse 16 and detects the data, which is in turn generated as output data 28, substantially corresponding to input data 12.

Figure 1A:
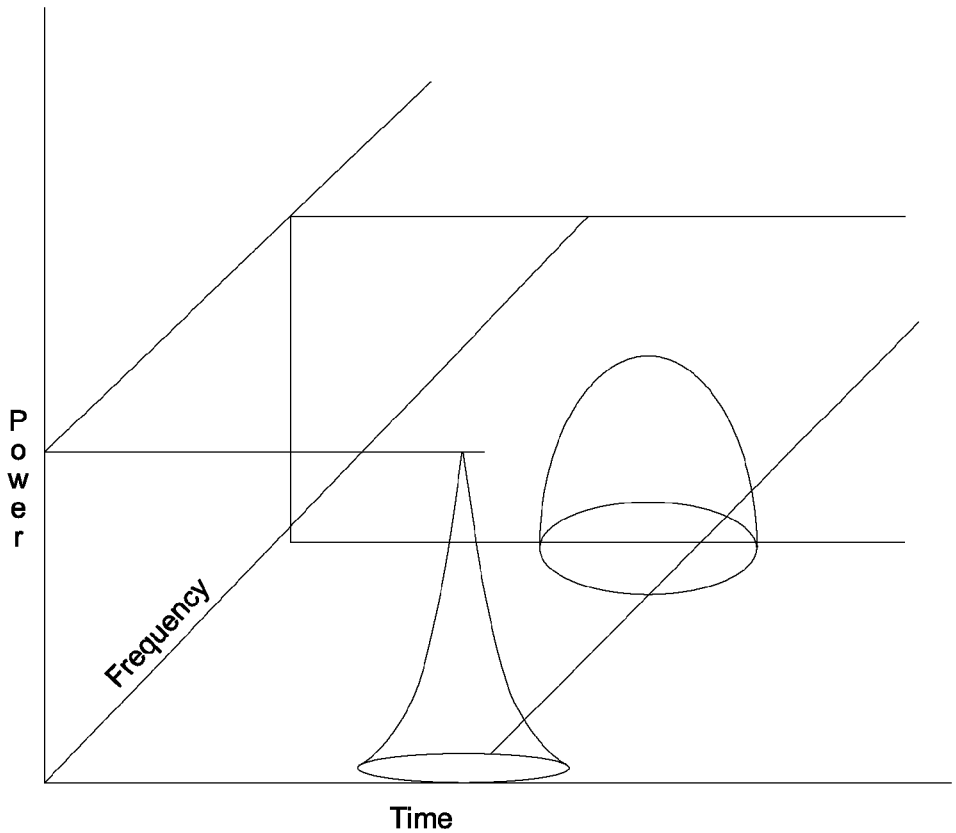
FIG. 1A is a diagrammatic representation of a waveform.

Turning now to FIG. 1A there is depicted the effect of the filter of an approximately Gaussian input pulse in both time and frequency.

One purpose of the Filter (encryptor) 18 is to substantially impede nonlinear interactions in an optical fiber by precompensating the signal pulses. This may be accomplished by reducing the power per unit time and frequency of the signal pulses, as well as imposing a nonlinear chirp. Reduction of power is beneficial for lessening both phase-matched and non-phase-matched nonlinear interactions in the fiber. The nonlinear chirp primarily works to diminish phase-matched nonlinearities.

The following examples are presented to further illustrate and explain the present invention and should not be taken as limiting in any regard. All physical and mechanical measurements were conducted using industry standard test methods.

Referring to FIG. 1A, it can be seen that the filter increases the width in both time and frequency. A specific increase in spectral width may be obtained for many (e.g. infinitely) different chirps. It should be noted that the optimum chirp is a direct function of the particular fibers used in the network.

In one example, it was found that to obtain an order of magnitude increase in launched power (while still avoiding nonlinearities) for a fiber length of 71 km, a factor of 2 increase in spectral width is required. The chirp has performed most efficiently when it was negative (more blue frequencies at the beginning of the pulse and more red frequencies at the end of the pulse) with a slope of at least 0.1 nm/ps. However, it should be noted that other slopes and chirps are useful under different network conditions.

Figure 2:
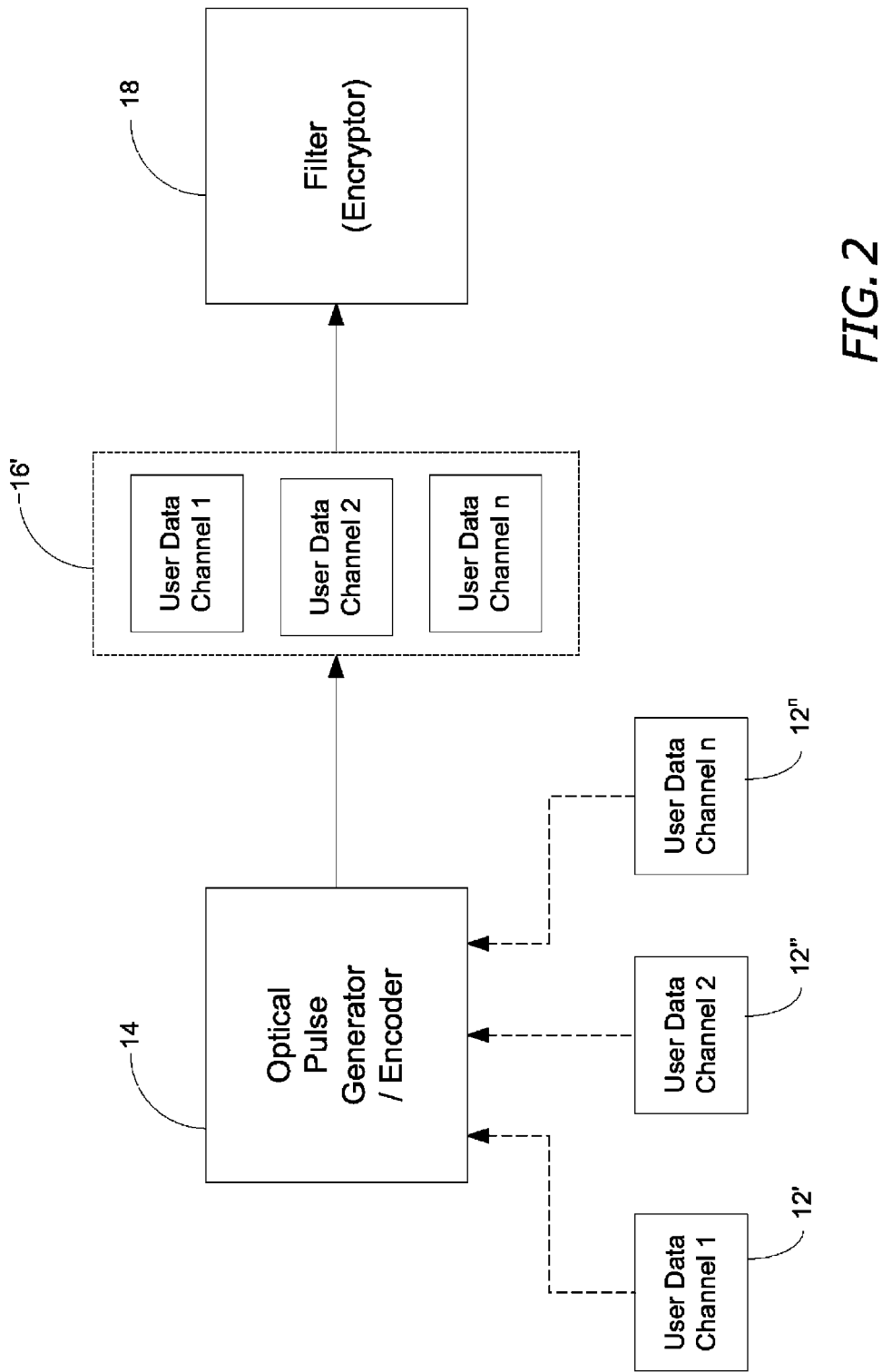
FIG. 2 is a block diagram according to FIG. 1.

Referring now to FIG. 2, the present invention is illustrated including multiple user data channels 12', 12", 12'''. In this particular embodiment it is contemplated that multiple user data channels 12', 12", 12''' may effectively be fed into optical pulse generator/encoder 14, which may be transformed from electrical data signals to a composite multiplexed optical signal 16'. Composite multiplexed optical signal 16' therefore includes multiple user data channels 12', 12", 12''' where each channel is separated by a wavelength distance.

It is contemplated that in this advantageous embodiment, filter (encryptor) 18 may again be used to alter the shape of optical pulse 16' by modifying both amplitude and phase with respect to time generating encrypted optical pulse 20'. This has the benefit of avoiding problems associated with third order nonlinearities as previously discussed while at the same time allowing for an increase in signal strength. Additionally, filter (encryptor) 18 may be used to decrease the wavelength distance between multiple user data channels 12', 12", 12''' by at least a factor of four, which acts to increase a total bandwidth of the optical pulse.

It is still further contemplated that the filter (encryptor) 18 may separate in time multiple user data channels 12', 12", 12''' that are occupying the same wavelength band.

Figure 3:
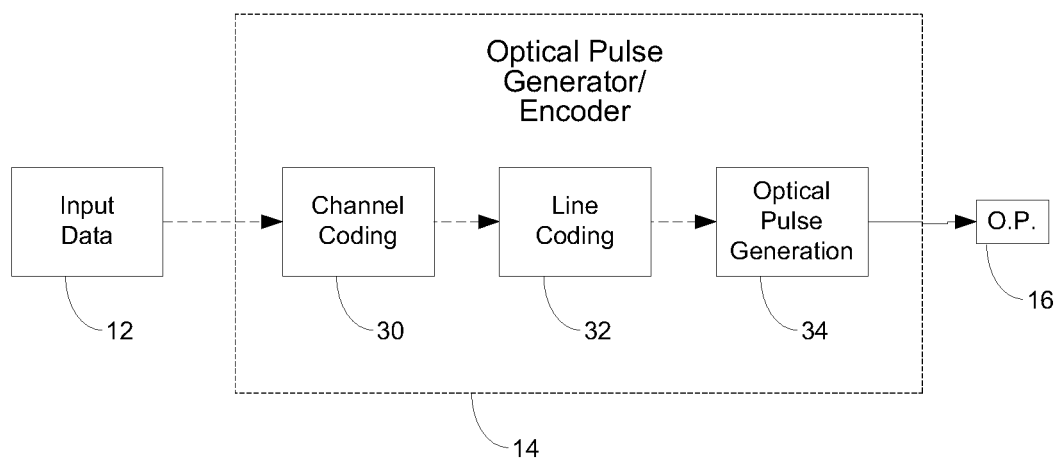
FIG. 3 is a block diagram according to FIG. 1.

Referring now to FIG. 3, various forms of data coding are illustrated. For example, input data 12 is fed into optical pulse encoder 14. As an initial function, optical pulse encoder 14 may apply, for example, channel coding 30 to input data 12, which may include the input data sequence plus a timing waveform to match to the channel. Optical pulse encoder 14 may further apply line coding 32 to input data 12, which may include combining the data and timing, and further adding the overhead of the waveform for error detection. The channel and line coded data may then be input to optical pulse generator 34 for conversion to an optical pulse.

Figure 4:
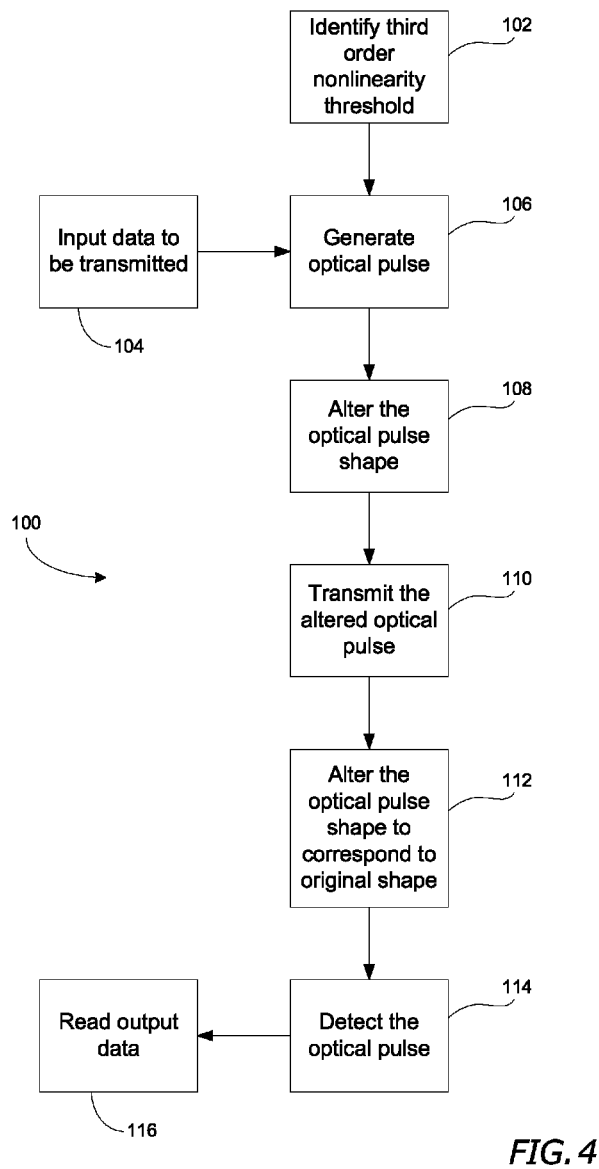
FIG. 4 is flow diagram illustrating the process according to the system shown in FIG. 1.

Referring now to FIG. 4, a flow diagram is illustrated depicting process 100 according to the present invention. As an initial step, identification of a third order nonlinearity threshold 102 is performed as is commonly done in industry. Data to be transmitted is inputted 104 to an optical pulse generator to generate an optical pulse 106. Notably, the power level of the generated pulse may advantageously exceed the identified third order nonlinearity threshold.

Figure 5:
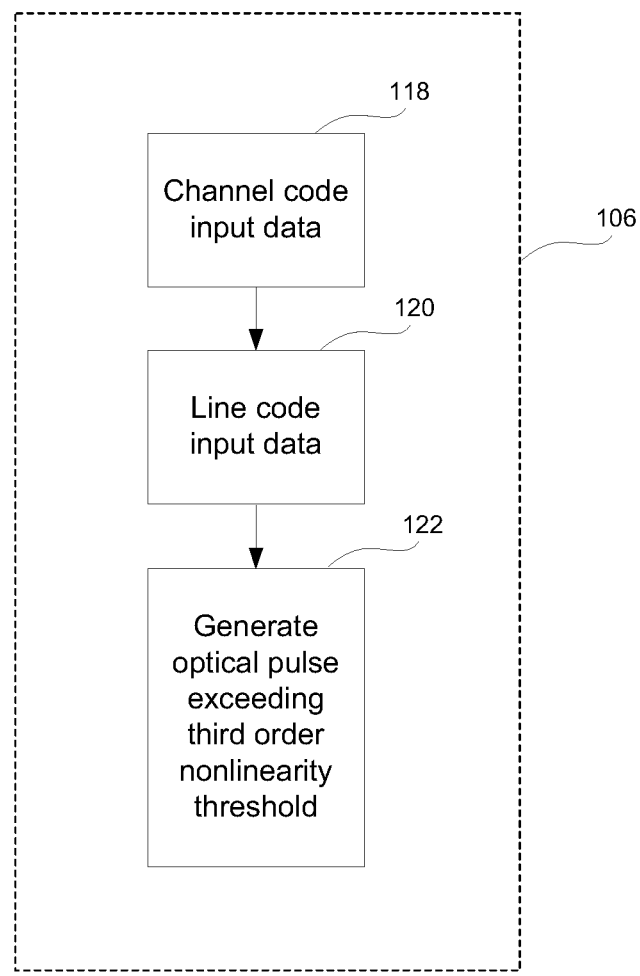
FIG. 5 is a flow diagram according to FIG. 4.

Once input into the optical generator/encoder, the input data may be channel coded 118 and line coded 120 as previously discussed herein (FIG. 5). The optical pulse or signal is then sent to a filter where the optical pulse is altered 108 such that the optical pulse that is to be transmitted does not exceed the third order nonlinearity threshold.

Figure 6:
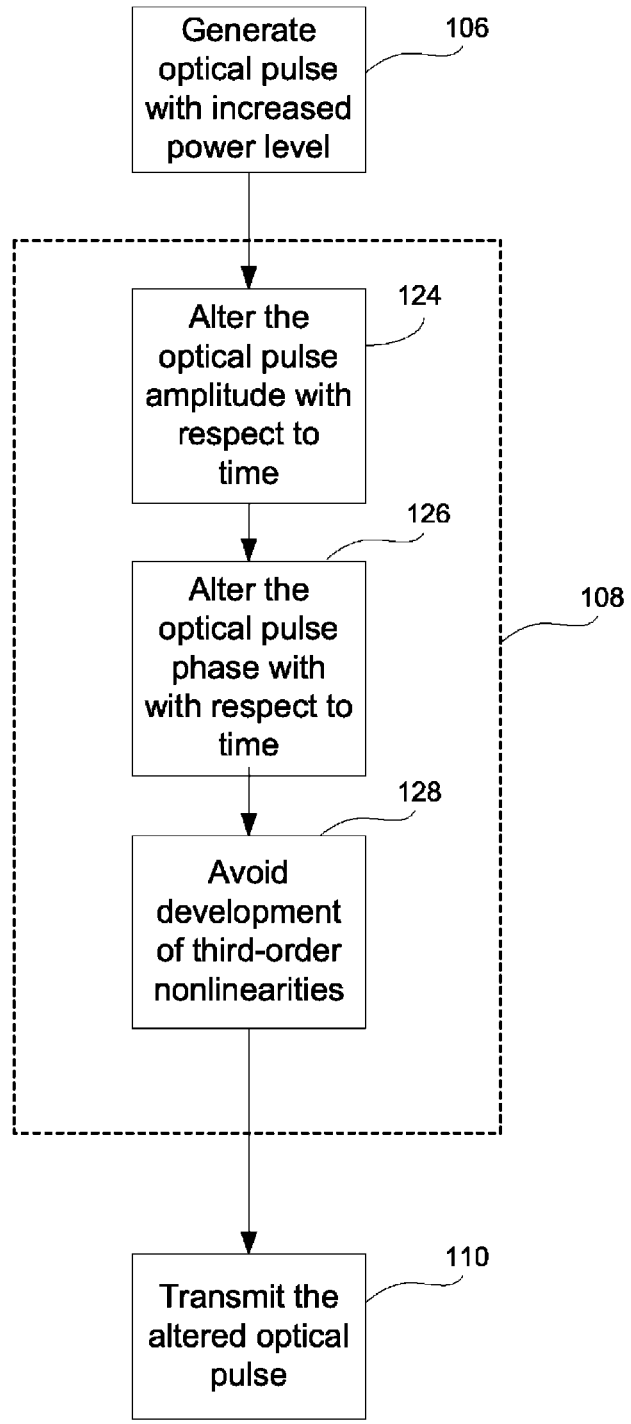
FIG. 6 is a flow diagram according to FIG. 4.

The optical signal is altered in a number of different ways, including, altering the optical pulse amplitude with respect to time 124 and altering the optical pulse phase with respect to time 126 (FIG. 6). This has the tendency to substantially avoid generation of third order nonlinearities 128 as previously described herein. Another advantage of this technique is that the power level of the optical pulse may exceed the third order nonlinearity threshold when originally generated, but is rearranged or altered prior to transmission such that the modified pulse does not exceed the threshold. In this manner, more energy may be input into the pulse allowing for an increase in the distance the signal may be transmitted over without need of a signal repeater.

The altered/encrypted pulse is then transmitted via the dielectric waveguide or optical fiber 110, which may or may not include, for example, repeaters (not shown) over a long haul fiber optic network.

Once the optical pulse has been transmitted via the dielectric waveguide, the altered or encrypted pulse may then be received and reformed or reconstituted back into the original waveform shape 112. This may be accomplished by providing a reversed matching filter as was used to originally alter or encrypt the optical pulse. The matching filter may be generated by the same formula as was utilized to generate to encryptor filter.

The reconstituted optical pulse is then fed to an optical detector/decoder where the optical pulse is detected 114, and may further be decoded as desired. The resulting output data may then be read 116, substantially corresponding to the input data.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Accordingly, various significant advantages may be realized by use of the present systems and methods described herein. Some of these advantages include, 1) increased power level of the optical pulse; 2) avoidance of third order nonlinearities; 3) temporally and spectrally sharing the energy of the pulses selectively for different users on the optical fiber to substantially increase system bandwidth; and 4) selective detection using a matched filter device providing for a highly secure encryption method of the optical waveform itself.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for transmitting an optical pulse along an optical transmission medium comprising the steps of:
   generating an optical pulse having a shape and a power level which exceeds a third-order nonlinearity threshold; and
   altering the optical pulse shape in both amplitude and phase with respect to time to form a modified optical pulse shape which is maintained at or below the third-order nonlinearity threshold so as to avoid development of third-order nonlinearities occurring in the optical transmission medium during transmission of the modified optical pulse.

2. The method according to claim 1, further comprising the step of embedding data within the optical pulse that is generated.

3. The method according to claim 2, further comprising the step of inputting the modified optical pulse into the optical transmission medium for propagation along the optical transmission medium.

4. The method according to claim 3, further comprising the steps of receiving the modified optical pulse from the optical transmission medium and altering the modified optical pulse shape in both amplitude and phase with respect to time to retrieve the original generated optical pulse.

5. The system according to claim 3, wherein said filter comprises a first filter and said system further comprises:
   a second filter coupled to the optical transmission medium, wherein the modified optical pulse is received by said second filter;
   said second filter altering the modified optical pulse shape in both amplitude and phase with respect to time to retrieve the original generated optical pulse.

6. The method according to claim 2, wherein the optical pulse comprises multiple user channels for transmitting the data, each channel being separated by a wavelength distance.

7. The method according to claim 6, wherein the step of altering the optical pulse shape in amplitude and phase further includes decreasing the wavelength distance by at least a factor of four to increase a total bandwidth of the optical pulse.

8. The method according to claim 2, wherein the data is coded.

9. The method according to claim 8, wherein the coding is selected from the group consisting of: channel coding, line coding and combinations thereof.

10. The method according to claim 1, wherein the optical transmission medium comprises at least one fiber optic cable.

11. The system according to claim 1, wherein the optical transmission medium comprises at least one fiber optic cable.

12. A system for generation of and transmission of an optical pulse along an optical transmission medium, the system comprising:
   an optical pulse generator for generating an optical pulse having a shape and a power level which exceeds a third-order nonlinearity threshold; and
   a filter coupled between said optical pulse generator and an optical transmission medium, said filter receiving the optical pulse from said optical pulse generator;
   said first filter altering a shape of the optical pulse in both amplitude and phase with respect to time to form a modified optical pulse shape, which is maintained at or below said third-order nonlinearity threshold so as to suppress generation of third-order nonlinearities in the optical transmission medium.

13. The system according to claim 12, wherein data is embedded within the optical pulse that is generated.

14. The system according to claim 13, wherein the modified optical pulse is input into the optical transmission medium for propagation along the optical transmission medium.

* * * * *